United States Patent
Sun

(10) Patent No.: US 7,199,791 B2
(45) Date of Patent: Apr. 3, 2007

(54) PEN MOUSE

(75) Inventor: Cheah Chiang Sun, Bagan Lallang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 484 days.

(21) Appl. No.: 10/692,879

(22) Filed: Oct. 23, 2003

(65) Prior Publication Data

US 2005/0088425 A1    Apr. 28, 2005

(51) Int. Cl.
   *G09G 5/00*    (2006.01)
   *G09G 5/08*    (2006.01)
(52) U.S. Cl. ...................... 345/179; 345/158
(58) Field of Classification Search ........ 345/156–158, 345/168, 179; 33/363 K; 178/19.01–19.05
See application file for complete search history.

(56) References Cited

U.S. PATENT DOCUMENTS

| | | | | |
|---|---|---|---|---|
| 5,079,845 A | * | 1/1992 | Childers | 33/363 K |
| 5,620,371 A | * | 4/1997 | Blonder | 345/168 |
| 6,097,374 A | * | 8/2000 | Howard | 345/168 |
| 6,151,015 A | * | 11/2000 | Badyal et al. | 345/179 |
| 6,897,854 B2 | * | 5/2005 | Cho et al. | 345/179 |

FOREIGN PATENT DOCUMENTS

JP          55-136464    *    4/1982    ................. 345/179

* cited by examiner

*Primary Examiner*—Amr A. Awad
*Assistant Examiner*—William Boddie

(57) ABSTRACT

A pointing device having an elongated body with a transparent end adapted for movement over a surface is disclosed. An illumination subsystem illuminates the surface in an area adjacent to the transparent end, and an imaging subsystem forms images of a portion of the surface in that area. The present invention also includes a reference mark system that defines a direction that is independent of rotations of the elongated body. A controller periodically compares two of the images to determine the distance and direction that the transparent end moved between the two images. The controller utilizes the direction defined in the reference mark system to reduce the computational workload. In one embodiment, the reference mark system includes a disk that is free to rotate about an axis through the disk and a sensor, and the position of a reference mark that is displaced from the axis is measured.

6 Claims, 5 Drawing Sheets

PEN MOUSE

FIELD OF THE INVENTION

The present invention relates to pointing devices, and more particularly, to optically-based pointing devices for use in data processing systems and the like.

BACKGROUND OF THE INVENTION

There are a large number of pointing devices for inputting positional data to a computer. The most commonly used of these is the "mouse". The mechanical version of the mouse consists of a handheld object that is moved over a surface. A ball within the device is in contact with the surface and rolls as the device is moved. The movement of the ball is sensed by detectors in the device which report the amount of motion along each of two directions periodically to the computer. The mechanical mouse picks up oil and other substances from the surface over which it rolls. These contaminants build up on the rollers used to sense the ball direction and interfere with the free motion of these rollers unless the rollers are periodically cleaned. The need for such cleaning operations has led to the introduction of the optical mouse, which does not suffer from this problem.

The optical mouse illuminates the surface over which the device is moved and periodically forms images of the surface. The illumination system enhances the rough features of the surface. The images are taken at time intervals that guarantee that two successive images share a significant portion of the field of view. By comparing the images, the distance and direction the device moved between the images can be determined.

While the mouse is an excellent solution to the problem of controlling the motion of a cursor on the computer screen, it is poorly suited for simulating a pen that can be used to input handwriting and the like. A number of pen-like pointing devices have been introduced to fill this need. One class of pen devices uses a stylus or similarly shaped object that is held like a pen such that its end moves over a special surface. The position of the pen on the surface is detected by sensors associated with the surface, and the position data is sent to the data processing system attached to the device. While such devices more nearly emulate a pen, they require a special writing surface that includes the sensors needed to track the stylus's motion. The cost of such systems is much greater than the cost of an optical mouse, and hence, these systems have not found wide spread acceptance. In addition, the tablets on which the user "writes" are of a fixed size. If the tablet is large, it is not suitable for portable computers. Similarly, if the tablet is small, the amount of data that can be written is significantly reduced.

An optical mouse, implemented in a pen-like housing, in principle, overcomes these problems. In such a device, an illumination system illuminates the surface of the workspace just under the pen, and an imaging system forms successive images of the surface as the pen moves over the surface. The successive images are then compared to one another to determine the amount and direction of motion of the pen between the images. Unfortunately, when a user "writes" with the device, the user tends to rotate the device in the user's hand as the user moves the device over the underlying surface. This rotation complicates the image comparisons, since the images must be now be compared for various displacements and rotations.

SUMMARY OF THE INVENTION

The present invention includes a pointing device having an elongated body with a transparent end adapted for movement over a surface. An illumination subsystem illuminates the surface in an area adjacent to the transparent end, and an imaging subsystem forms images of a portion of the surface in that area. The present invention also includes a reference mark system that defines a direction that is independent of rotations of the elongated body. A controller periodically compares two of the images to determine the distance and direction that the transparent end moved between the two images. The controller utilizes the direction defined in the reference mark system to reduce the computational workload inherent in this comparison. In one embodiment, the reference mark system includes a disk that is free to rotate about an axis through the disk and a sensor. The disk includes a reference mark that is displaced from the axis, the disk having an orientation mechanism that maintains the disk in a fixed orientation relative to the earth. The sensor determines the location of the reference mark relative to the elongated body. In one embodiment, the orientation mechanism includes a weight on the disk in which the weight is displaced from the axis. In another embodiment, the orientation mechanism includes a magnet attached to the disk that causes the disk to orient itself in a direction defined by the earth's magnetic field. In another embodiment, the sensor includes an optical system for projecting an image of the disk into the imaging subsystem. In yet another embodiment, the sensor includes a separate reference mark sensor that measures the orientation of the disk relative to the elongated body.

DETAILED DESCRIPTION OF THE PREFERRED EMBODIMENTS OF THE INVENTION

Figure 1:
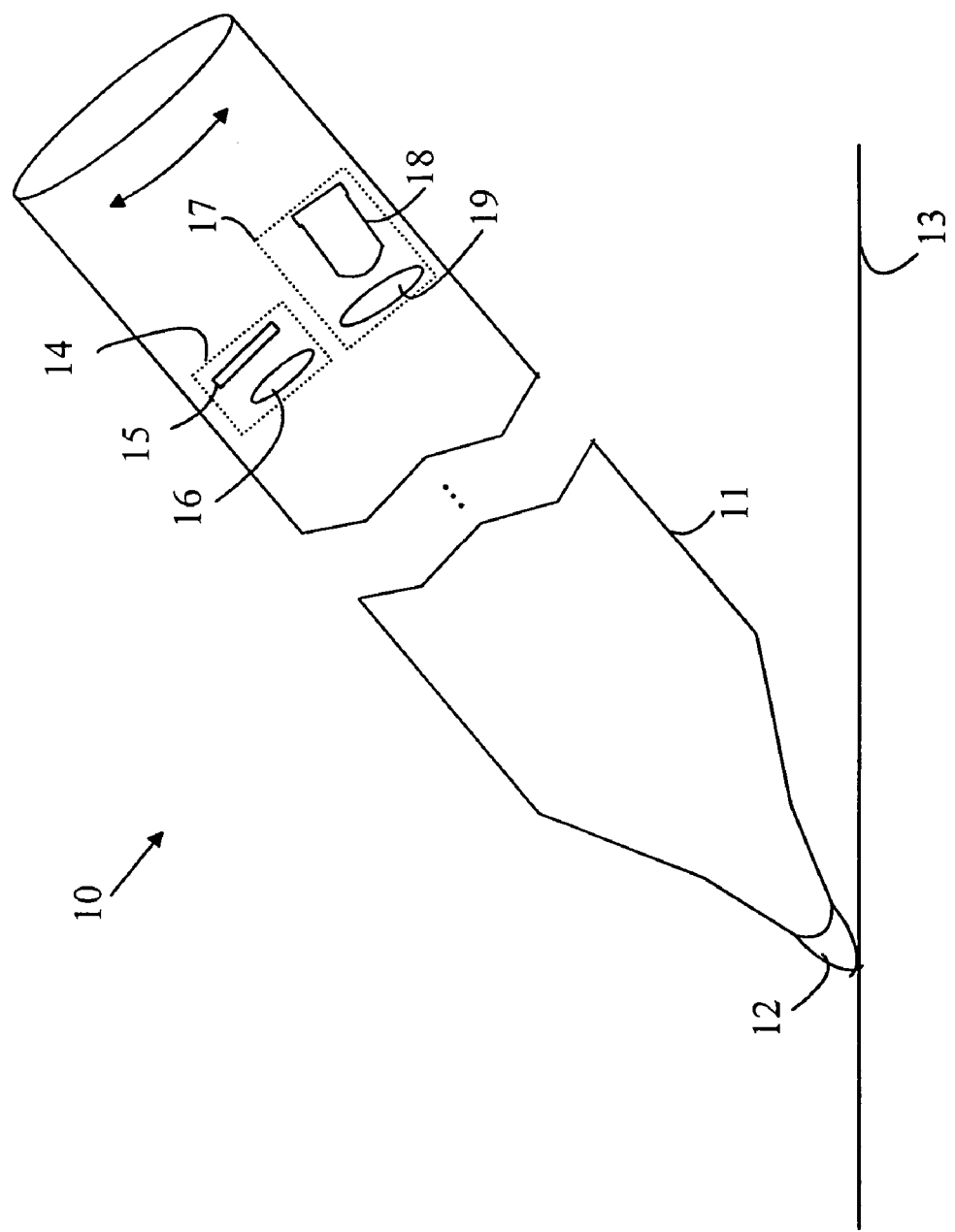
FIG. 1 illustrates the basic elements of a prior art pen mouse 10.

The manner in which the present invention provides its advantages can be more easily understood with reference to FIG. 1, which illustrates the basic elements of a prior art pen mouse 10. Pen mouse 10 includes a body 111 having a transparent tip 12. When pen mouse 10 moves over a surface 13 in a manner that simulates writing on surface 13, the area in the vicinity of tip 12 is illuminated by light from an illumination subsystem shown at 17. Illumination subsystem 17 typically includes an LED 18 and a collimating lens 19. The illuminated area is imaged by an imaging subsystem 14, which typically includes an imaging lens 16 that images the illuminated surface onto an imaging array 15.

A controller that is either a part of pen mouse 10 or implemented on the data processing system to which pen mouse 10 is connected reads out images from imaging array 15 at predetermined intervals. The controller compares successive images to determine the direction and distance through which tip 12 has moved between each pair of images.

As noted above, the user tends to rotate the body of pen mouse 10 while "writing". This complicates the distance and direction computations since the imaging array 15 also rotates when the pen mouse rotates. The image comparison typically operates by computing the correlation between the second image and an image generated by displacing and/or rotating the first image. In conventional optical mouse pointing systems, the amount of rotation of the mouse is relatively small, and hence, the number of rotations that must be tested is relatively small. In contrast, the number of potential rotations in the pen mouse is much larger. Since the computational workload is proportional to the number of rotations that must be tested, a pen mouse requires a much greater computational capability.

Figure 2:
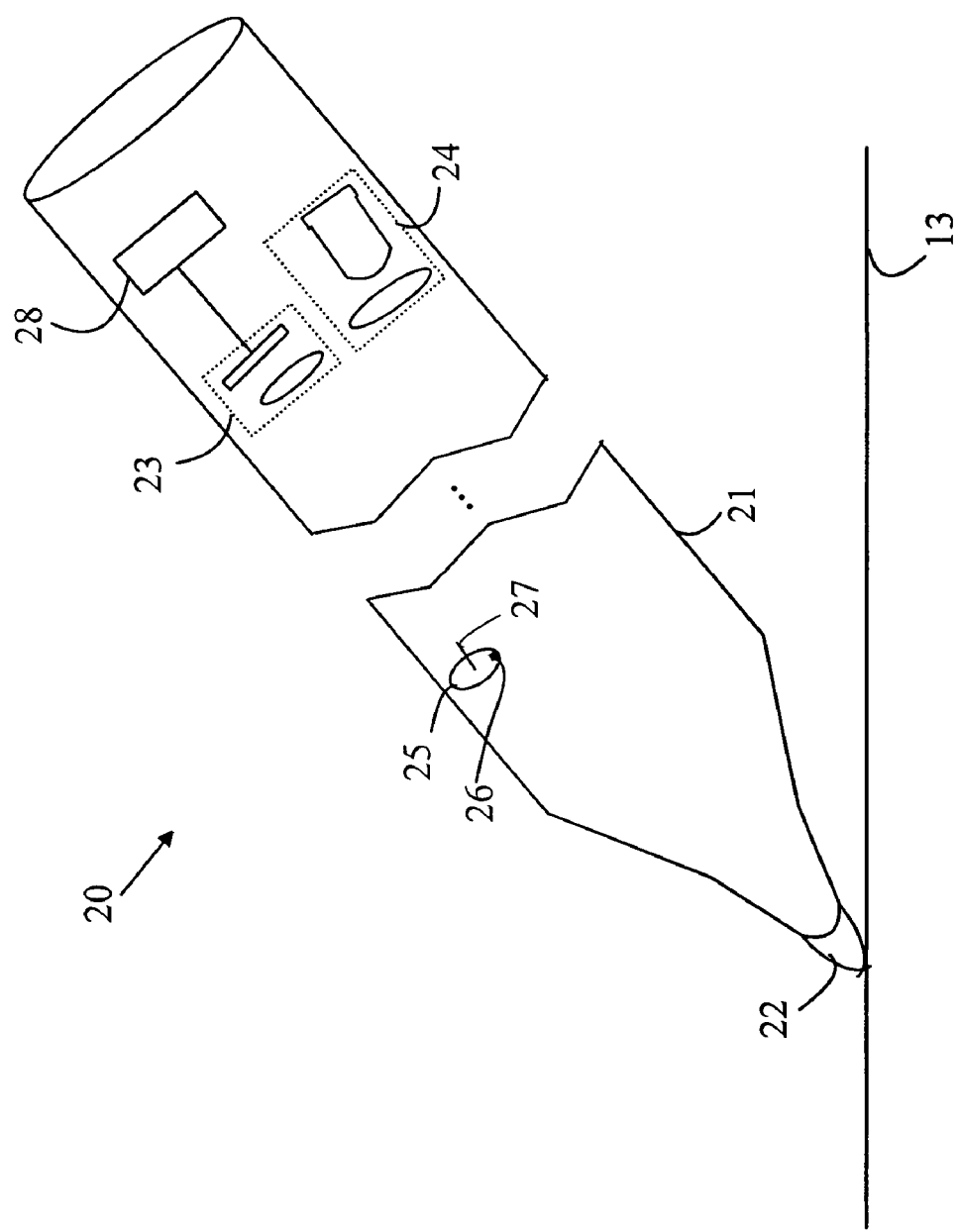
FIG. 2 illustrates one embodiment of a pen mouse according to the present invention.

The present invention utilizes a reference mark system to estimate the rotation of the pen mouse between successive frames, and hence, reduces the number of rotations that must be tested when comparing successive images of surface 13. Refer now to FIG. 2, which illustrates one embodiment of a pen mouse according to the present invention. Pen mouse 20 includes a body 21 that is held by the user. The body includes an illumination system 24 and an imaging system 23, which serve functions analogous to those described above with reference to pen mouse 10. That is, illumination system 24 illuminates the region of surface 13 in the vicinity of tip 22, and imaging system 23 forms an image of a portion of that region.

Pen mouse 20 also includes a reference mark system that includes a transparent disk 25 that has an opaque reference mark 26 thereon. Disk 25 is mounted such that it maintains an orientation that is substantially independent of the orientation of body 21. In one embodiment, disk 25 is weighted at one point on its periphery, e.g. reference mark 26 can be weighted. Disk 25 is mounted on a shaft 27 that allows disk 25 to rotate such that the weight point always points in a downward direction. The disk is positioned such that the reference mark is within the field of view of imaging system 23. Hence, as the orientation of body 21 changes, the position of the mark in the image also changes, since the image of the reference mark will now fall on a different portion of the imaging array in the imaging system.

Pen mouse 20 includes a controller 28 that receives the images from imaging system 23. Controller 28 examines each image for the location of the image generated by reference mark 26. The image generated by reference mark 26 is preferably a small compact black region of a known size. Hence, controller 28 need only look for a black region of the known size within the image. Once controller 28 finds the image of the mark, controller 28 compares the location of the image in the current frame with that of the image of the reference mark in the previous frame. If the image of the reference mark has not moved, then controller 28 assumes that no change in the orientation of the body has occurred. If the position of reference mark 26 changes, controller 28 determines the amount of rotation that has occurred between the frames. Controller 28 then limits the rotation values attempted in the correlation operation discussed above to a few values around the observed change in orientation.

In the embodiment shown in FIG. 2, the depth of the field of the imaging system must be sufficient to capture both the image of surface 13 in the vicinity of window 22 and still form a usable image of reference mark 26. In this regard, it should be noted that reference mark 26 can be somewhat out of focus and still provide the desired orientation information. This embodiment is preferred because it requires minimal changes in the design of the prior art pen mouse. To aid in meeting this focus requirement, the location of disk 25 is preferably as close to window 22 as possible.

Figure 3:
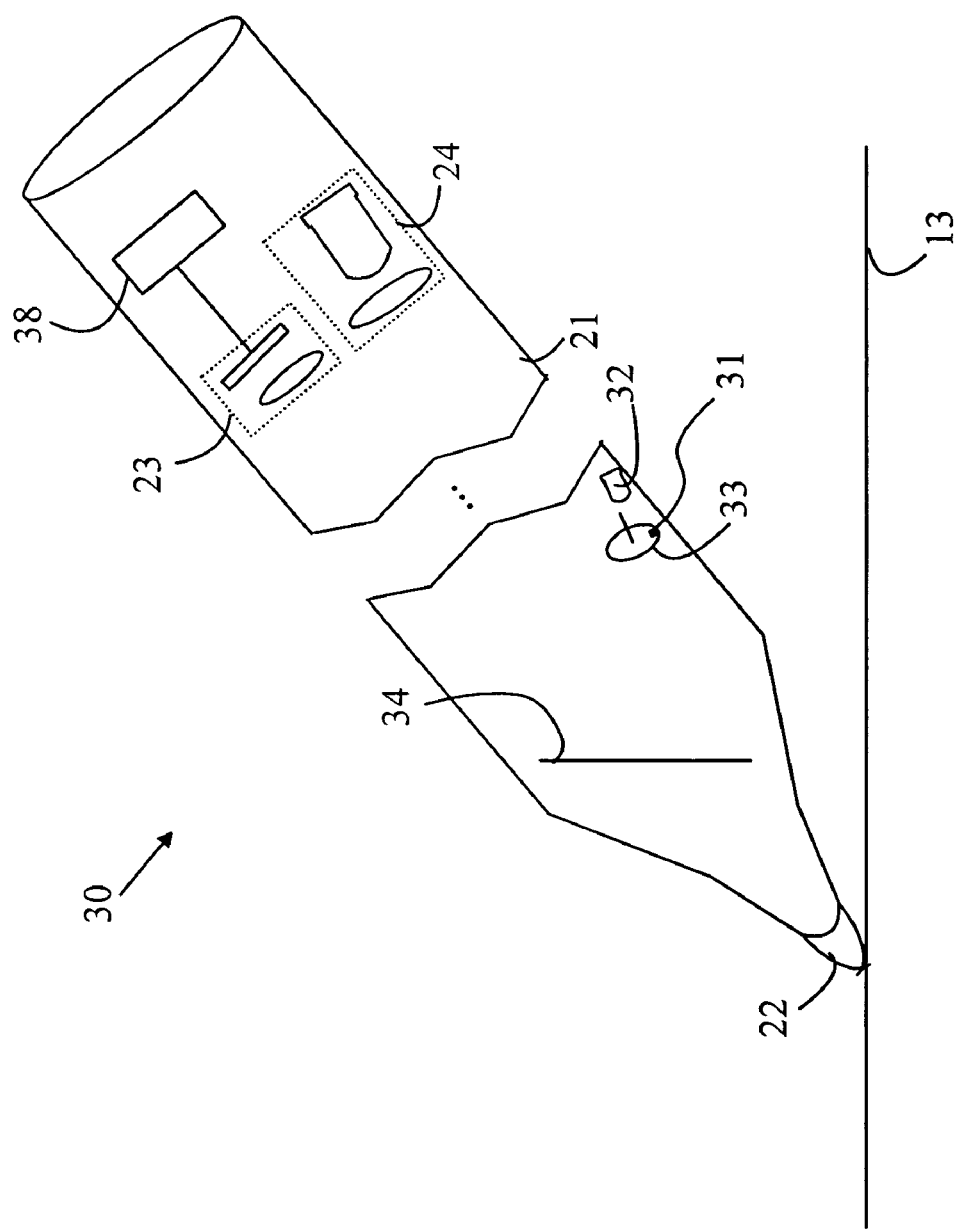
FIG. 3 illustrates another embodiment of a pen mouse according to the present invention that utilizes a reference mark system that has a separate illumination system.

The above embodiments utilize a marker that blocks a portion of the light reflected from surface 13. These embodiments require fewer components; however, as noted above, these embodiments place restrictions on the location of the reference mark. Refer now to FIG. 3, which illustrates another embodiment of a pen mouse according to the present invention. Pen mouse 30 utilizes a reference mark system that has a separate illumination system, and hence can be positioned with more freedom than the reference mark system discussed above. To simplify the following discussion, those elements of pen mouse 30 that perform functions analogous to elements discussed above have been given the same reference numbers and will not be discussed in detail here.

Pen mouse 30 includes a reference mark system that includes an illumination source 32 and a disk 33 having a reference mark 31 whose position remains substantially fixed when the body 21 of pen mouse 30 is rotated. Light from light source 32 is reflected into imaging subsystem 23 by a partially reflecting mirror 34 which mixes the reference light signal with the light reflected from surface 13. Light source 32 may include an imaging lens that images disk 33 onto the imaging array in imaging subsystem 23. The focal length of this lens is chosen such that the image of reference mark 31 is in focus. Hence, the reference mark system can be placed at a much larger number of locations. For example, the reference mark system can be placed such that it is out of the field of view of the imaging subsystem.

The preferred reference mark is a transparent mark located in an opaque disk. The wavelength of light source 32 can be chosen to be sufficiently different from that of the light source in illumination subsystem 24 to enable the two signals to be separated based on the color difference.

The above-described embodiments of the present invention utilize the imaging array in the imaging subsystem 23 to detect the location of the reference mark. This arrangement reduces the cost of these embodiments, since a separate detector for the reference system is not needed. However, these embodiments require a more complex processing system in that controllers 28 and 38 must find the reference marks, determine the degree of rotations, and then perform the relevant correlations without using the pixels covered by the reference mark in the images.

Figure 4:
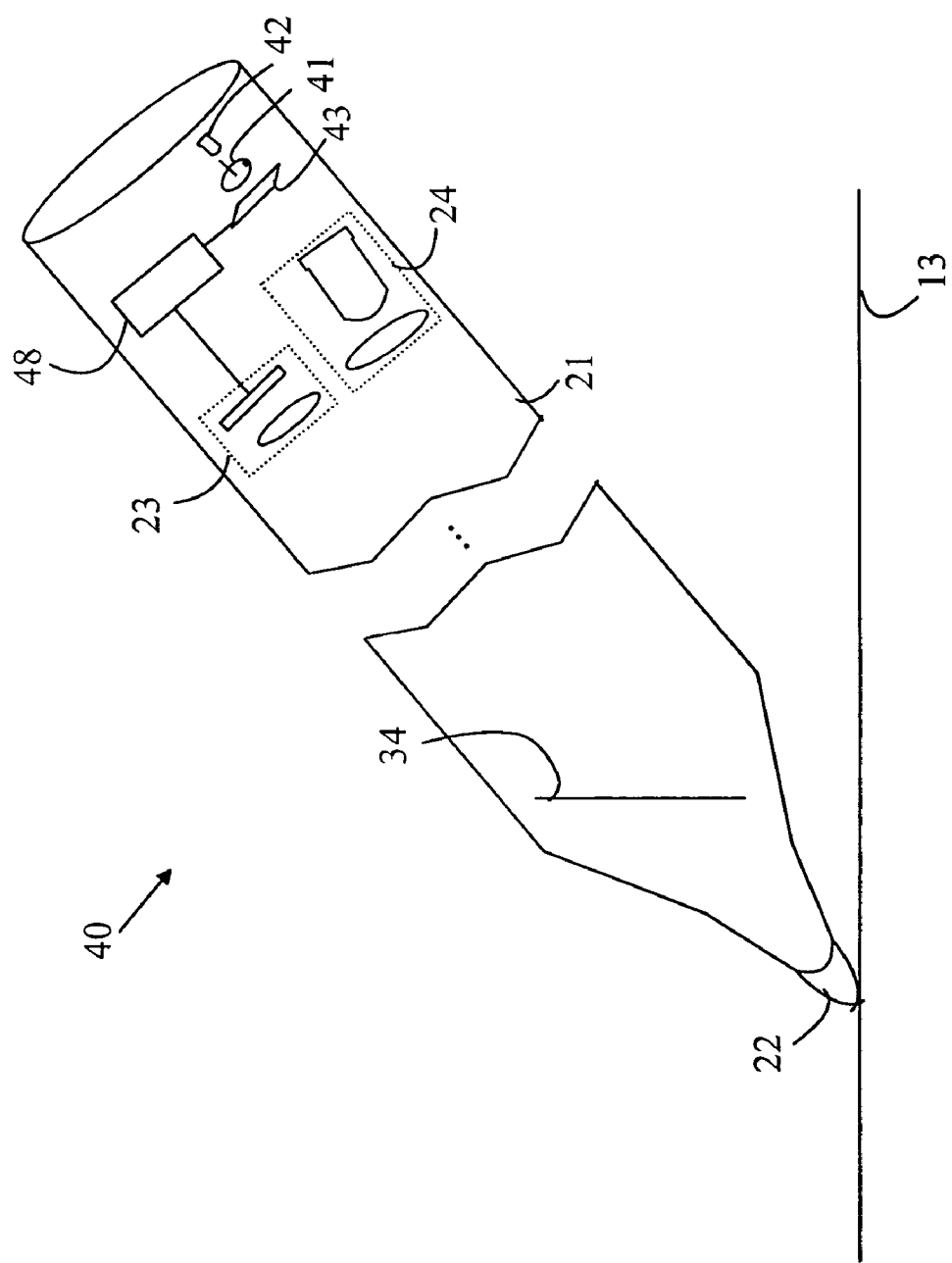
FIG. 4 illustrates an embodiment of a pen mouse according to the present invention that utilizes a reference mark system that has a separate illumination system and a separate detection system.

Refer now to FIG. 4, which illustrates another embodiment of a pen mouse according to the present invention. Pen mouse 40 utilizes a reference mark system that has a separate illumination system and a separate detection system. To simplify the following discussion, those elements of pen mouse 40 that perform functions analogous to elements discussed above have been given the same reference numbers and will not be discussed in detail here.

Pen mouse 40 utilizes a reference mark system that includes an illumination source 42 and a disk 41 having a reference mark whose position remains substantially fixed when the body 21 of pen mouse 40 is rotated. Light from light source 42 is imaged onto a separate detection array 43 whose image is processed by controller 48. Since the reference mark system in this embodiment does not rely on either the illumination subsystem 24 or the imaging subsystem 23, the reference mark system can be placed at any appropriate location within the pen mouse. In addition, there is no need to "unfold" the reference mark image from that of surface 13, and hence, the processing demands on controller 48 are reduced relative to the demands placed on controllers 28 and 38 discussed above.

Figure 5:
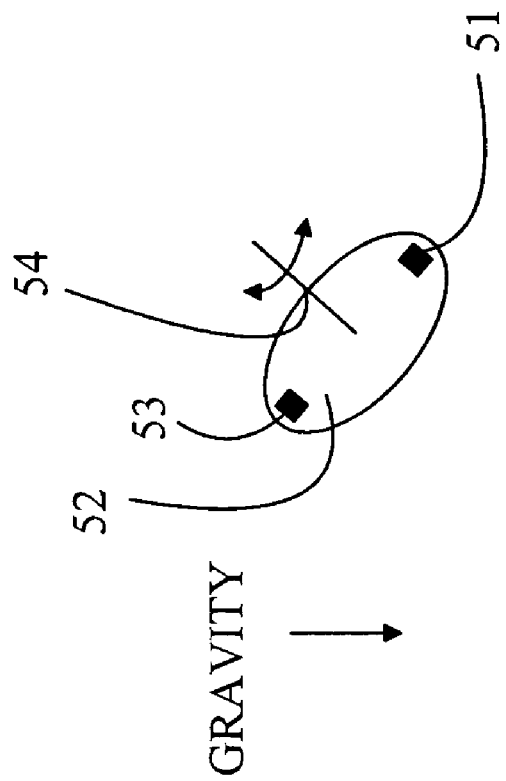
FIG. 5 is a more detailed view of a disk adapted for use in the reference mark assemblies described above.

Refer now to FIG. 5, which is a more detailed view of a disk adapted for use in the reference mark assemblies described above. The above-described embodiments utilize a particular reference mark system to provide a measurement of the rotation of the pen mouse body. In these embodiments a disk 52 that is free to rotate about an axis 54 is used. The disk has an off-axis weight 51 and a reference mark 53. As long as the axis of rotation is not parallel to the earth's gravitational force, the disk will rotate such that the heaviest portion is closest to the earth. In general, a user writes in a manner that places the pen mouse body at an angle with respect to surface 13 discussed above. Hence, if the pen mouse has a cylindrical body, the axis of that body, in general, will not be parallel to the earth's gravitational force. Accordingly, axis 54 is preferably parallel to the axis of the pen mouse body.

It should be noted that embodiments that utilize two reference mark systems can be used to guarantee that the axis of at least one of the disks in one of the reference mark systems is at an angle with respect to the earth's gravitational force. In such a system, the two disks are mounted such that the angles of the axes of rotation differ in a manner that assures that at least one of the axes is at an angle to the earth's gravitational force.

It should also be noted that the present invention will still operate if the reference mark system becomes inoperative due to the user inadvertently aligning the axis of rotation of the disk with the direction of the earth's gravitational force. In this case, the controller will need to try more angles when correlating the successive images, and the performance of the pen mouse will be reduced to that of a conventional pen mouse.

Figure 6:
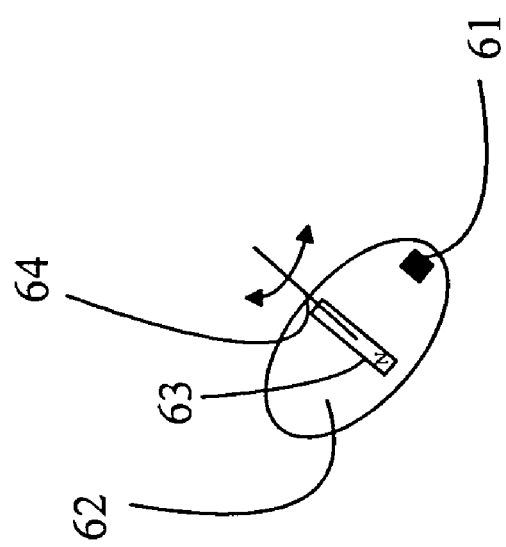
FIG. 6 illustrates another embodiment of a reference mark system according to the present invention.

The above described embodiments utilize a reference mark system that utilizes the earth's gravitational field to define a direction that does not change when the pen mouse body is rotated. However, any other mechanism that defines an orientation that does not change substantially when the body of the mouse is rotated can be utilized. Refer now to FIG. 6, which illustrates another embodiment of a reference mark system according to the present invention. In this system, disk 62 rotates about axis 64. A bar magnet 63 causes the disk to align itself in a fixed position relative the earth's magnetic field. Reference mark 61 can be detected using any of the schemes discussed above.

Various modifications to the present invention will become apparent to those skilled in the art from the foregoing description and accompanying drawings. Accordingly, the present invention is to be limited solely by the scope of the following claims.

What is claimed is:

1. A pointing device comprising:
   an elongated body having a transparent end adapted for movement over a surface;
   an illumination subsystem that illuminates said surface in an area adjacent to said transparent end;
   an imaging subsystem that forms images of a portion of said surface in said area;
   a reference mark system that defines a direction that is independent of the rotations of said elongated body and measures the orientation of said elongated body relative to said direction; and
   a controller that periodically compares two of said images by rotating one of the two said images by a rotational value, said comparison and rotational value depending on the amount by which said elongated body rotated between said images as determined from said orientation.

2. A pointing device comprising:
   an elongated body having a transparent end adapted for movement over a surface;
   an illumination subsystem that illuminates said surface in an area adjacent to said transparent end;
   an imaging subsystem that forms images of a portion of said surface in said area;
   a reference mark system that defines a direction that is independent of the rotations of said elongated body; and
   a controller that periodically compares two of said images by rotating one of the two said images by a rotational value, said comparison and rotational value depending on the amount by which said elongated body rotated between said images,
   wherein said reference mark system comprises:
   a disk that is free to rotate about an axis through said disk, said disk comprising a reference mark that is displaced from said axis, said disk having an orientation mechanism that maintains said disk in a fixed orientation relative to the earth; and
   a sensor for determining the location of said reference mark relative to said elongated body.

3. The pointing device of claim 2 wherein said orientation mechanism comprises a weight on said disk, said weight being displaced from said axis.

4. The pointing device of claim 2 wherein said orientation mechanism comprises a magnet attached to said disk.

5. The pointing device of claim 2 wherein said sensor comprises an optical system for projecting an image of said disk into said imaging subsystem.

6. The pointing device of claim 2 wherein said sensor comprises a reference mark sensor that measures the orientation of said disk relative to said elongated body.

* * * * *